(12) United States Patent
Bachnak et al.

(10) Patent No.: US 6,386,056 B1
(45) Date of Patent: May 14, 2002

(54) WORM-GEAR WITH ELECTRIC MOTOR

(75) Inventors: Nouhad Bachnak, Frankfurt; Otmar Ganser, Kronberg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/351,764

(22) Filed: Jul. 12, 1999

(30) Foreign Application Priority Data

Jul. 15, 1998 (DE) ......................... 198 31 739

(51) Int. Cl.$^7$ ................................................ F16H 1/08
(52) U.S. Cl. ............................. 74/89.14; 74/425
(58) Field of Search ..................... 74/411, 606 R, 74/425, 89.14, 416; 384/537, 504; 464/30, 31, 32, 33, 34, 35, 36, 37, 38, 39, 40, 41, 42, 43, 44, 45, 46, 47, 48; 310/89

(56) References Cited

U.S. PATENT DOCUMENTS

| | | | | |
|---|---|---|---|---|
| 2,641,139 A | * | 6/1953 | Beisner ........................ 74/425 |
| 2,881,629 A | * | 4/1959 | Homier ........................ 74/425 |
| 3,892,986 A | | 7/1975 | Allen |
| 4,020,715 A | * | 5/1977 | Sollars ..................... 74/606 R |
| 4,689,725 A | * | 8/1987 | Saijo et al. .................... 362/66 |
| 4,715,462 A | | 12/1987 | Taig |
| 4,864,873 A | | 9/1989 | Eto et al. |
| 4,930,367 A | * | 6/1990 | Nagasawa ............. 74/606 R X |
| 5,034,870 A | * | 7/1991 | Weber ................. 74/606 R X |
| 5,184,039 A | * | 2/1993 | Kraft ........................... 310/89 |
| 5,213,000 A | * | 5/1993 | Saya et al. ..................... 74/425 |
| 5,287,770 A | * | 2/1994 | Mudd ................... 74/606 R X |
| 5,572,906 A | * | 11/1996 | Jorg ............................. 74/425 |
| 5,780,751 A | | 7/1998 | Nomerange et al. |
| 5,836,219 A | * | 11/1998 | Klingler et al. ........ 74/606 R X |
| 5,839,320 A | * | 11/1998 | Komachi ..................... 74/425 |
| 6,032,550 A | * | 3/2000 | Rugh ........................... 74/425 |

FOREIGN PATENT DOCUMENTS

| | | | |
|---|---|---|---|
| DE | 4429173 C1 | 8/1984 | |
| DE | 3939343 A1 | 11/1989 | |
| DE | 19542047 A1 | 11/1995 | |
| DE | 195 18 196 A | 11/1996 | ........... B62D/5/04 |
| DE | 19653962 A1 | 12/1996 | |
| EP | 0205812 A2 | 12/1986 | |
| EP | 0 471 876 A | 2/1992 | ........... H02K/5/15 |
| EP | 0657340 A1 | 6/1995 | |
| EP | 0 681 359 A | 11/1995 | ........... H02K/7/116 |
| FR | 2 449 354 A | 9/1980 | ........... H02K/7/08 |
| WO | WO9100989 | 1/1991 | |
| WO | WO 97/18119 | * 5/1997 | |
| WO | WO 98 10971 A | 3/1998 | ........... H02K/7/116 |

* cited by examiner

Primary Examiner—David Fenstermacher
Assistant Examiner—Colby Hansen
(74) Attorney, Agent, or Firm—David M. Thimmig; Mayer, Brown, Rowe & Maw

(57) ABSTRACT

A worm-gear has an electric motor, which drives a worm, which meshes with a worm-wheel. Hitherto both the motor shaft and the output shaft have been mounted in a housing which, for assembly reasons, only permits a sliding fit between the motor shaft and its bearings. In order to simplify the assembly and permit the desirable interference fit between the motor shaft and its bearings, provision is made for both bearings for the motor shaft to be arranged in a first housing part, which, when the shaft is installed, can be separated from and re-connected to a second housing part, in which two bearings for the output shaft are arranged.

14 Claims, 9 Drawing Sheets

WORM-GEAR WITH ELECTRIC MOTOR

BACKGROUND OF THE INVENTION

The invention relates to a worm-gear having an electric motor, on whose motor shaft a worm sits, an output shaft, on which a worm-wheel meshing with the worm sits, and a housing, in which the motor shaft and the output shaft are mounted.

Such worm-gears, as are used, for example, in electric steering aids, are disclosed, for example, by DE 198 11 784. Such a worm-gear is assembled in such a way that first of all the worm-wheel is fastened to the output shaft integrated in the steering column and then the worm is fitted into the motor-shaft bearing installed beforehand in the gear housing. To this end, it is necessary for the motor shaft to be located in a sliding fit in the bearing inner ring. This constitutes an unfavorable installation situation, since the inner ring and the load direction rotate relative to one another (peripheral load). Consequently every point of the inner ring is loaded during a revolution of the shaft. In principle, it is desirable, when peripheral load is present, to install the bearing ring, rotating relative to the load, via an interference fit in order to avoid relative movements between the bearing ring and the shaft, which relative movements may lead to wear of the fitting surface.

However, the hitherto conventional gear housings of worm-gears only permit the assembly sequence described above, so that an interference fit of the motor shaft in the bearing inner ring of the outer motor-shaft bearing cannot be realized.

A further problem in the hitherto known worm-gears consists in the fact that the electric motor is fully integrated in the entire unit and therefore cannot be checked separately. A check on the electric motor is only possible within the scope of the entire system after the complete dismantling of the steering aid and must be carried out by the steering-column/gear manufacturer, although the electric motor is supplied by another manufacturer. An added problem for the production sequences is that the interface between electric motor and gear is not clearly defined in the hitherto known variants.

The object of the invention is to provide a worm-gear with an electric motor in which the electric motor can be checked as a separate unit and in which the motor shaft can be connected to the inner rings of the bearings via a press fit.

SUMMARY OF THE INVENTION

According to the invention, the object is achieved by a worm-gear of the type mentioned at the beginning in which both bearing points of the motor shaft are arranged in a first part of the housing, which, when the shafts are installed, can be separated from and re-connected to a second part of the housing, in which the two bearing points of the output shaft are provided.

The divisible housing enables the electric motor together with its housing part to be removed when the worm-gear is assembled, so that, for example when used as an electric steering aid, the second part of the housing can remain assembled with the output shaft integrated in the steering column. The manufacturing sequences are also simplified, since the first part of the housing may be preassembled by the partner who is responsible for the electrical equipment of the system, for example of a vehicle, whereas the second part of the housing may be preassembled by the partner who is responsible for the mechanical components of the system. In this case, the interface between electric motor and gear can also be clearly established.

In the case of the worm-gear according to the invention, it is easily possible to remove the electric motor for maintenance purposes and to check it separately.

Due to the split housing and the omission of the hitherto rigidly predetermined assembly sequence, it is now also possible to arrange the inner rings of the bearings of the motor shaft on the latter in a press fit, a factor which is desirable when a peripheral load occurs.

In a first variant, the dividing plane of the two housing parts may lie between the worm and the electric motor, the longitudinal axis of the dividing plane intersecting the motor shaft. In this variant of a split gear housing, the housing part with the electric motor is pushed in the axial direction relative to the motor shaft into the second part of the housing and is screwed to the latter.

A further variant provides for the dividing plane of the two housing parts to lie between the longitudinal axes of the motor shaft and the output shaft.

Compared with the variant described above, the dividing plane between the longitudinal axes of the shafts permits a variable arrangement of the bearing points of the motor shafts. These bearing points may be provided at both ends of the motor shaft, or one bearing point of the motor shaft may be provided between the worm and the electric motor, and the other bearing point may be provided at one end of the motor shaft. However, in the first variant having a dividing plane intersecting the motor shaft, the bearings may only be provided between worm and electric motor and at the motor-side end of the motor shaft.

A third variant is configured in such a way that the dividing plane intersects the steering column in the axial direction, that is, the dividing plane is placed in the longitudinal axis of the steering column.

These different variants are used depending on the available construction space, the production techniques applied (in particular during the casting of the individual housing parts), and the assembly.

The bearing point at the motor-side end of the motor shaft is preferably arranged in a motor-housing cover, which can be removed from the first part of the housing.

In a preferred development of the variant having a dividing plane lying between the two longitudinal axes of the shafts, provision is made for a torque sensor to be provided on the output shaft, the measuring signal of which torque sensor can be detected by a transformer coil which is arranged in the first part of the housing and is coupled to control electronics, likewise arranged in the first part of the housing, for controlling the electric motor. The integration of transformer coil and control electronics in the first housing part constitutes a further simplification of the production sequence, in particular since the manufacturer of the motor components is usually also the manufacturer of the other electrical components and the complete preassembly may therefore be carried out at the premises of this system supplier. Only the torque sensors, usually based on the strain-gage principle, are to be provided at the output shaft.

The devices already known per se for absorbing overload moments may also be readily used in the worm-gear according to the invention. For example, the worm-wheel may be coupled to the output shaft via an overload clutch, or the motor shaft may be mounted so as to be axially displaceable against a restoring force.

The worm-gear according to the invention is preferably used in electric steering aids of vehicles (power-assisted steering), but is not restricted to this field of application.

BRIEF DESCRIPTION OF THE DRAWINGS

Exemplary embodiments of the invention will be dealt with in more detail below with reference to the attached drawings, in which.

DETAILED DESCRIPTION OF THE PREFERRED EMBODIMENT

Figure 1:
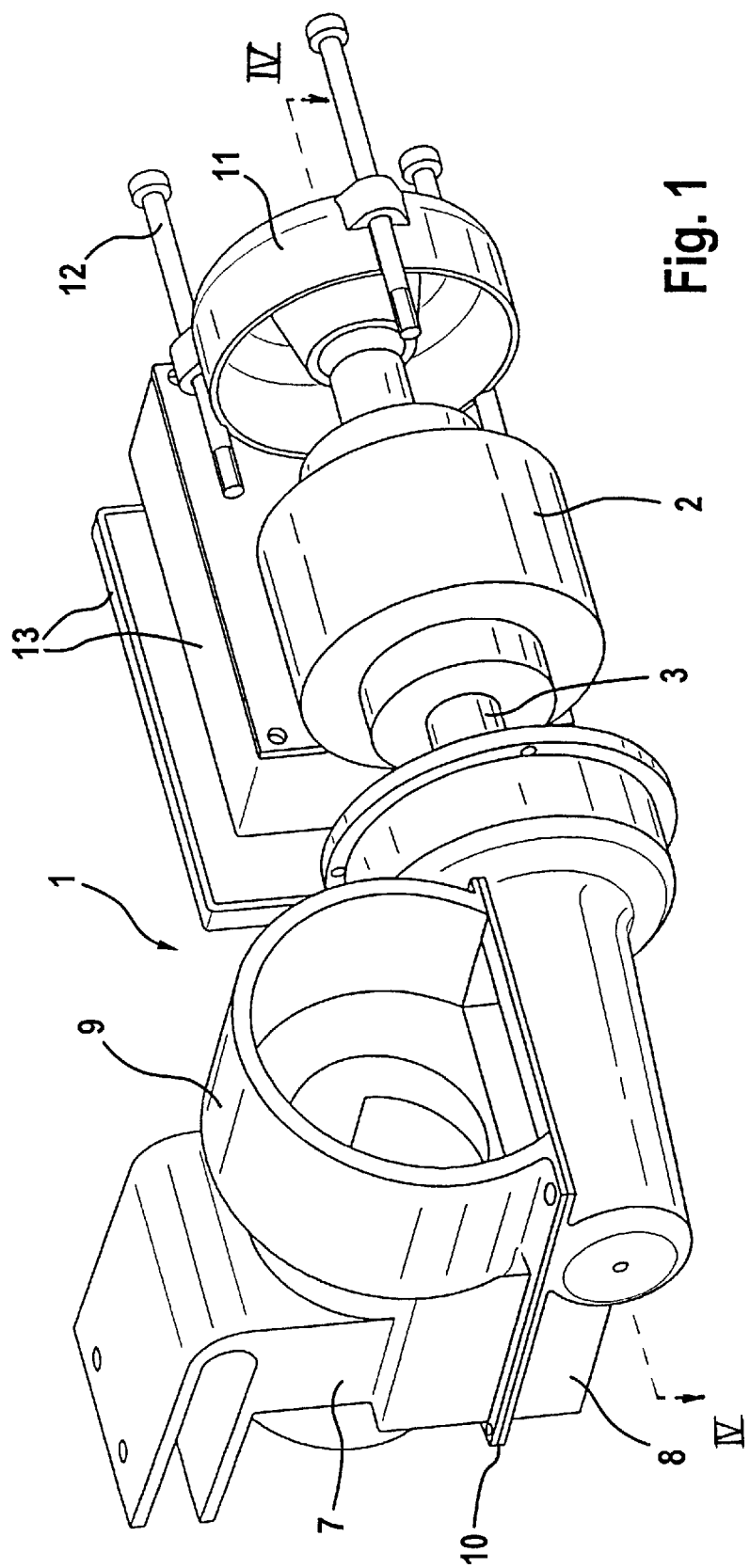
FIG. 1 shows a schematic oblique view of a worm-gear housing with detached electric motor.

A worm-gear 1 is shown in the dismantled state in FIG. 1. An electric motor 2, on whose motor shaft 3 a worm 4 (see FIGS. 4 to 7) sits, is shown in a detached position. The worm 4 may be made in one piece from the body of the motor shaft 3.

A worm-wheel 5 sits on the output shaft 6 (see FIGS. 4 to 7) and meshes with the worm 4.

The worm-gear 1 has a gear housing 7, which consists of a first housing part 8, which accommodates the electric motor 2 and the motor shaft 3, and a second housing part 9, in which the output shaft 6 with the worm-wheel 5 is mounted. A dividing plane 10 separates the first housing part 8 from the second housing part 9 parallel between the output shaft 6 and the motor shaft 3. The two housing halves 8, 9 are fastened to one another, such as by means of screws (not shown).

The electric motor 2 is fastened to the first housing part 8 by means of a motor-housing cover 11, which belongs to the electric motor 2 and is screwed against the first housing part 8 by means of three threaded studs 12.

In the embodiment shown in FIG. 1, a separate housing part 13 accommodates the control electronics for activating the electric motor 2.

Figure 2:
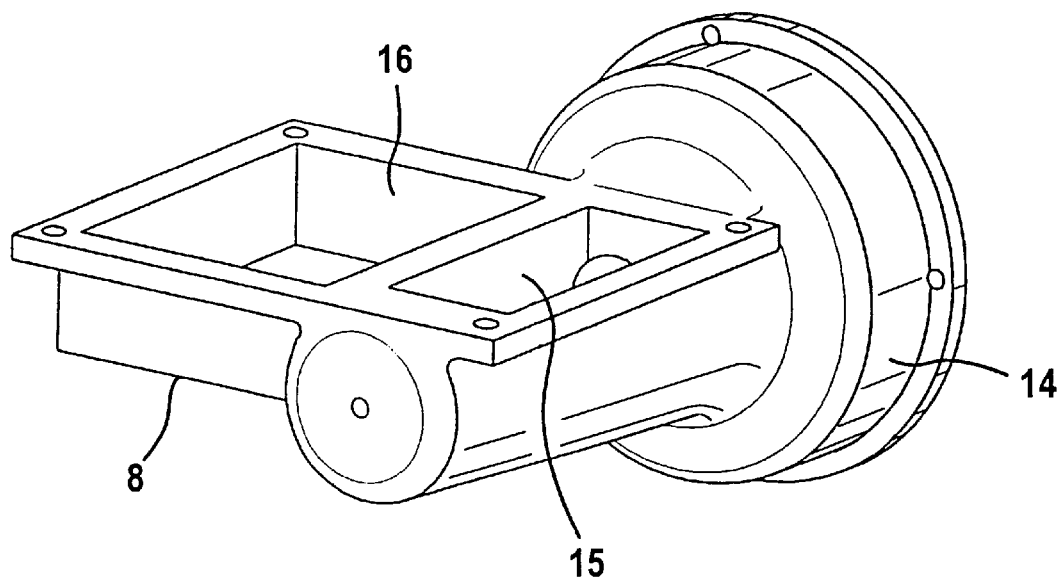
FIG. 2 shows an oblique view of a first housing part of the worm-gear housing according to FIG. 1.
Figure 3:
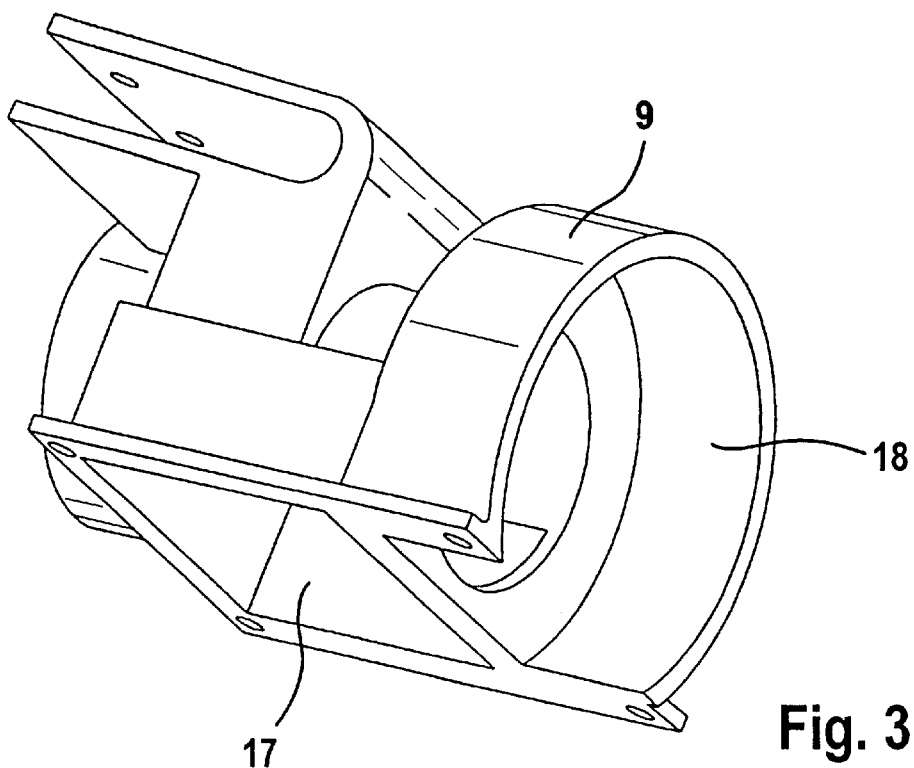
FIG. 3 shows an oblique view of the second housing part of the worm-gear housing according to FIG. 1.

The two housing parts 8, 9 are shown individually separate from one another in FIGS. 2 and 3. The first housing part can be divided essentially into three regions, namely a flange 14, to which the electric motor 2 is fastened, a gear space 15, in which the worm 4 meshes with the worm-wheel 5, and a further chamber 16, which can accommodate a transformer (not shown) and if need be the control electronics accommodated in the housing 13 in the embodiment in FIG. 1 (also see FIG. 7). The transformer coil interacts with a torque sensor working according to the strain-gage principle, the torque sensor sitting on the output shaft 6 and being arranged in a chamber 17 in the second housing part 9. DE 197 47 001.7 or also DE 198 14 261.7 from the same applicant disclose designs of sensors which work according to the strain-gage principle; in this respect, reference is made to the designs described there, although these are not the only designs, but rather other designs as well as other measuring principles may also be used.

In addition, the second housing part 9 has a space 18 for accommodating the worm-wheel 5, which space is at first open to the outside and can be closed by a cover 19 (see FIG. 7) after the installation of the output shaft 6.

Figure 4:
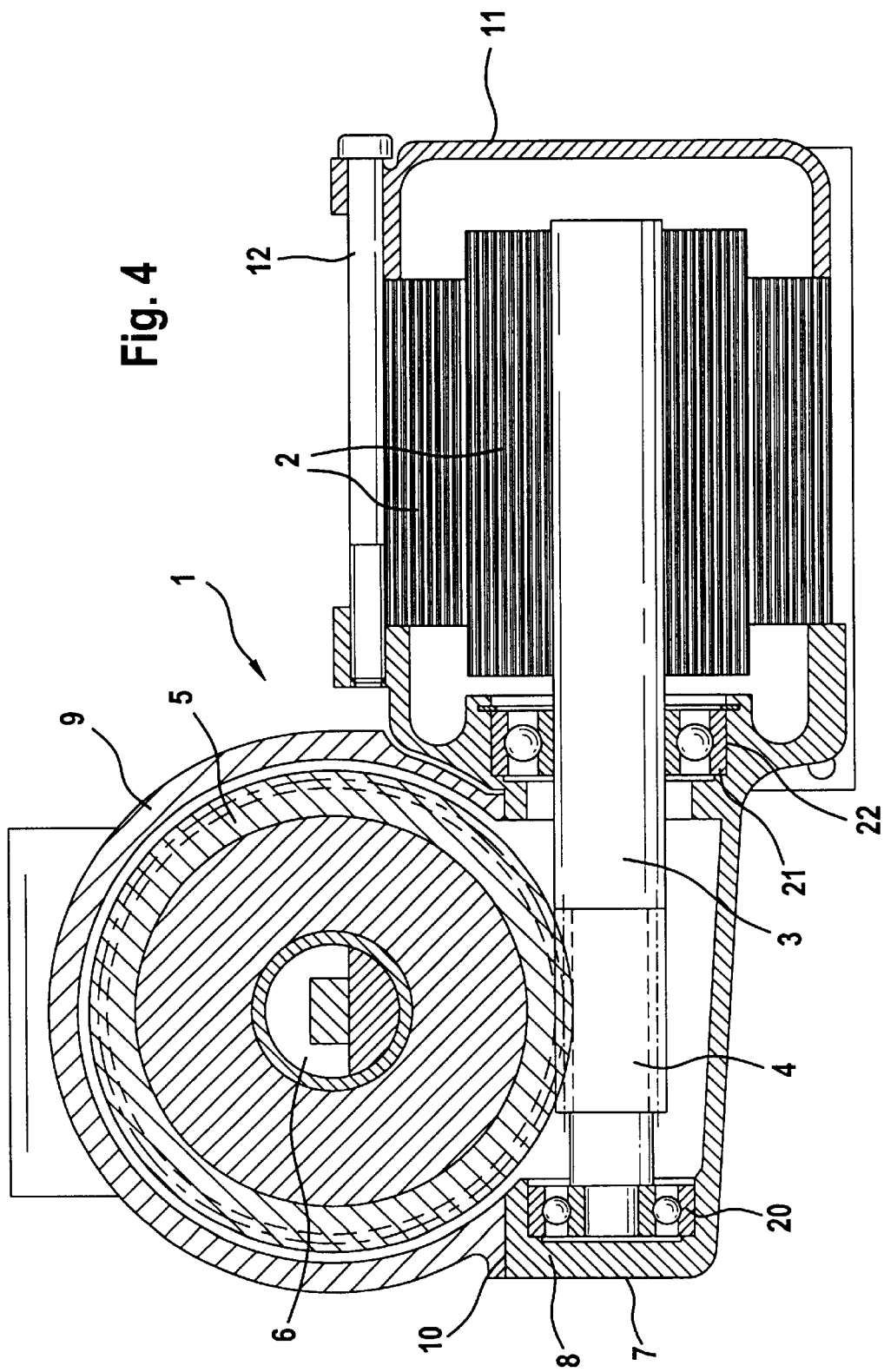
FIG. 4 shows a cross section IV—IV of the worm-gear housing according to FIG. 1.
Figure 5:
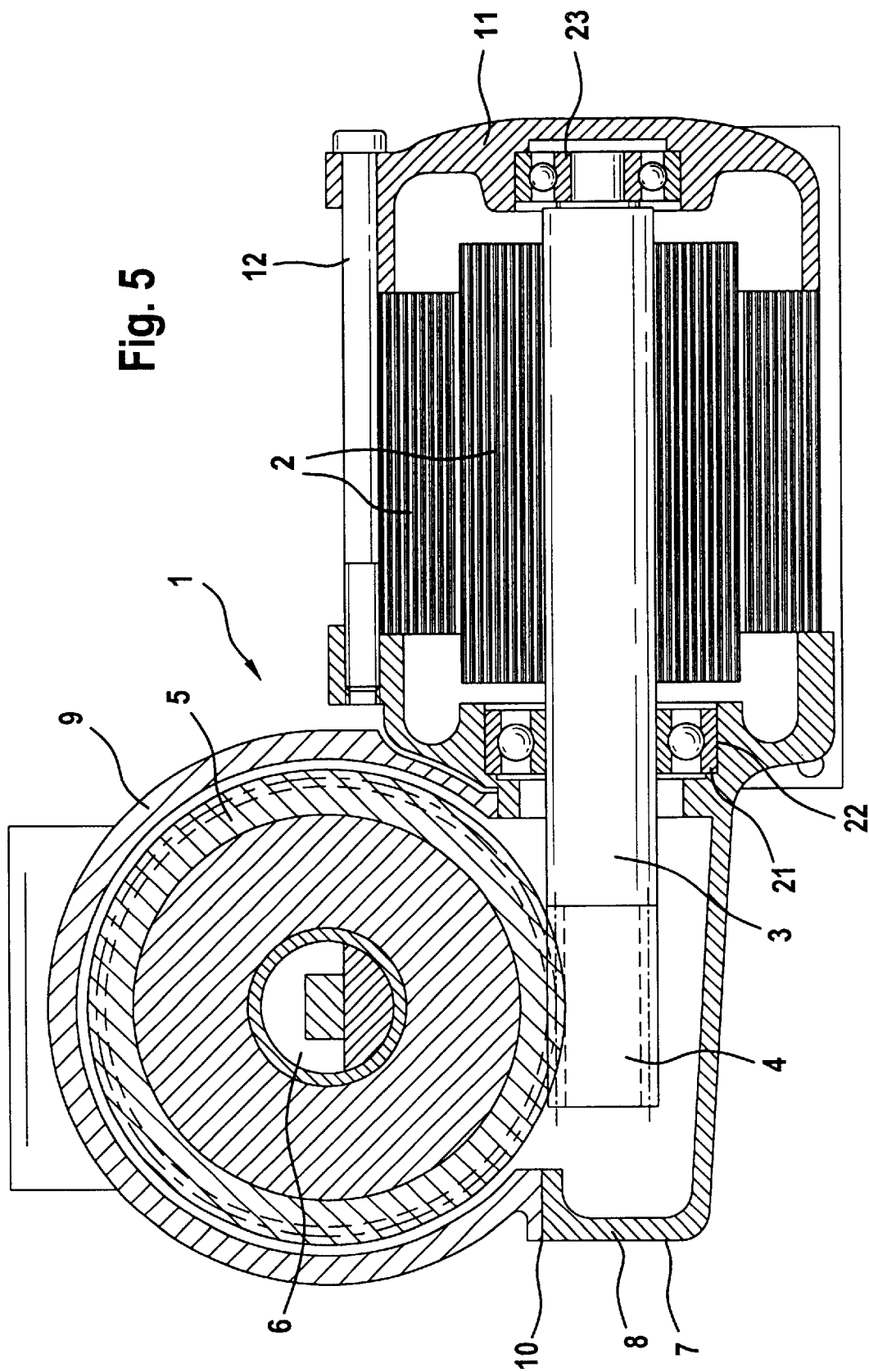
FIG. 5 shows a cross section of a worm-gear housing with modified motor-shaft mounting.
Figure 6:
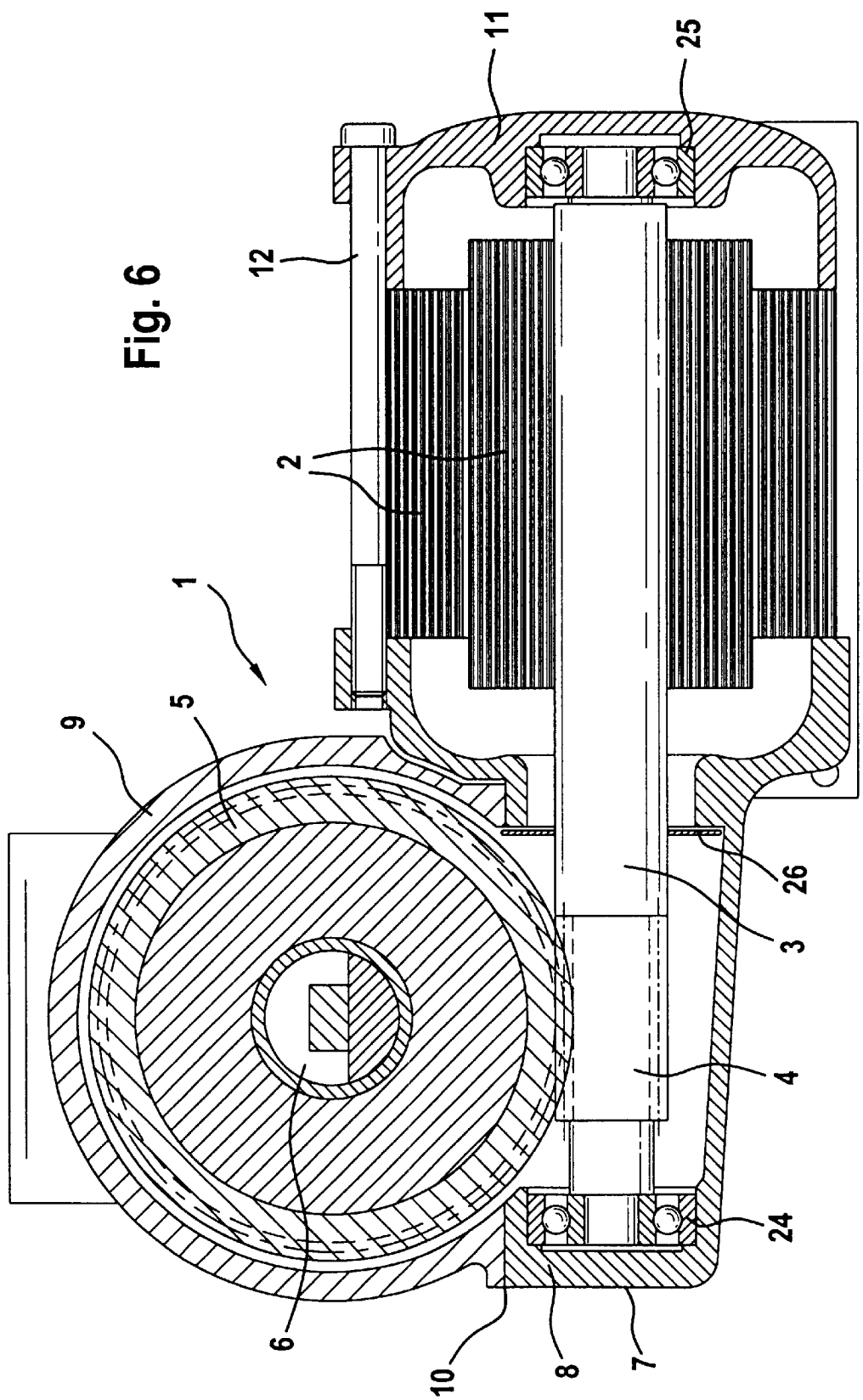
FIG. 6 shows a cross section of a worm-gear housing with a further variant of a motor-shaft mounting.

Three different variants of the mounting of the motor shaft are shown in FIGS. 4 to 6. In the arrangement shown in FIG. 4, the worm 4 is located between the two rolling-contact bearings 20, 21, the inner rings of which each sit in the interference fit on the outer periphery of the motor shaft 3. The interference fit between the bearings 20, 21 and the motor shaft 3 is possible because the bearing 20 provided at the end of the motor shaft 3 may be of substantially smaller dimensions than the bearing 21 arranged between the worm 4 and the electric motor 2, so that the bearing 20, preassembled together with the shaft, fits without problem through a cutout in the first housing part 8, and the second bearing 21, which sits in a larger inside diameter 22, is axially supported on the edge of said cutout.

In the variant depicted in FIG. 5, the motor shaft 3 is not mounted at the free end of the worm 4 but at the motor-side end with a bearing 23 in the motor-housing cover 11 in addition to the bearing 21. In this variant, it is easily possible to place the dividing plane between the first housing part 8 and the second housing part 9, for example perpendicularly to the motor shaft 3, so that the detaching of the electric motor with its housing part 8 is effected by pulling the unit out of the opening in the second housing part 9.

A third variant of the arrangement of bearing points is shown in FIG. 6, this embodiment corresponding to the variant shown in FIG. 1. In this case, the motor shaft is mounted by means of a first bearing 24 at the worm-side end of the motor shaft and by a second bearing 25 in the motor-housing cover 11 at the motor-side end of the motor shaft 3. Provided between the gear space 15 (see FIG. 2) and the electric motor 2 is a dividing wall 26, through which the motor shaft 3 projects. Instead of the dividing wall 26, a so-called slinger disk, by means of which contaminants are kept away from the electric motor 2, may be connected to the motor shaft 3. This applies in particular to keeping lubricants in the gear region away from the electric motor 2, so that these lubricants are held in the gear region by the centrifugal forces of the slinger disk.

Figure 7:
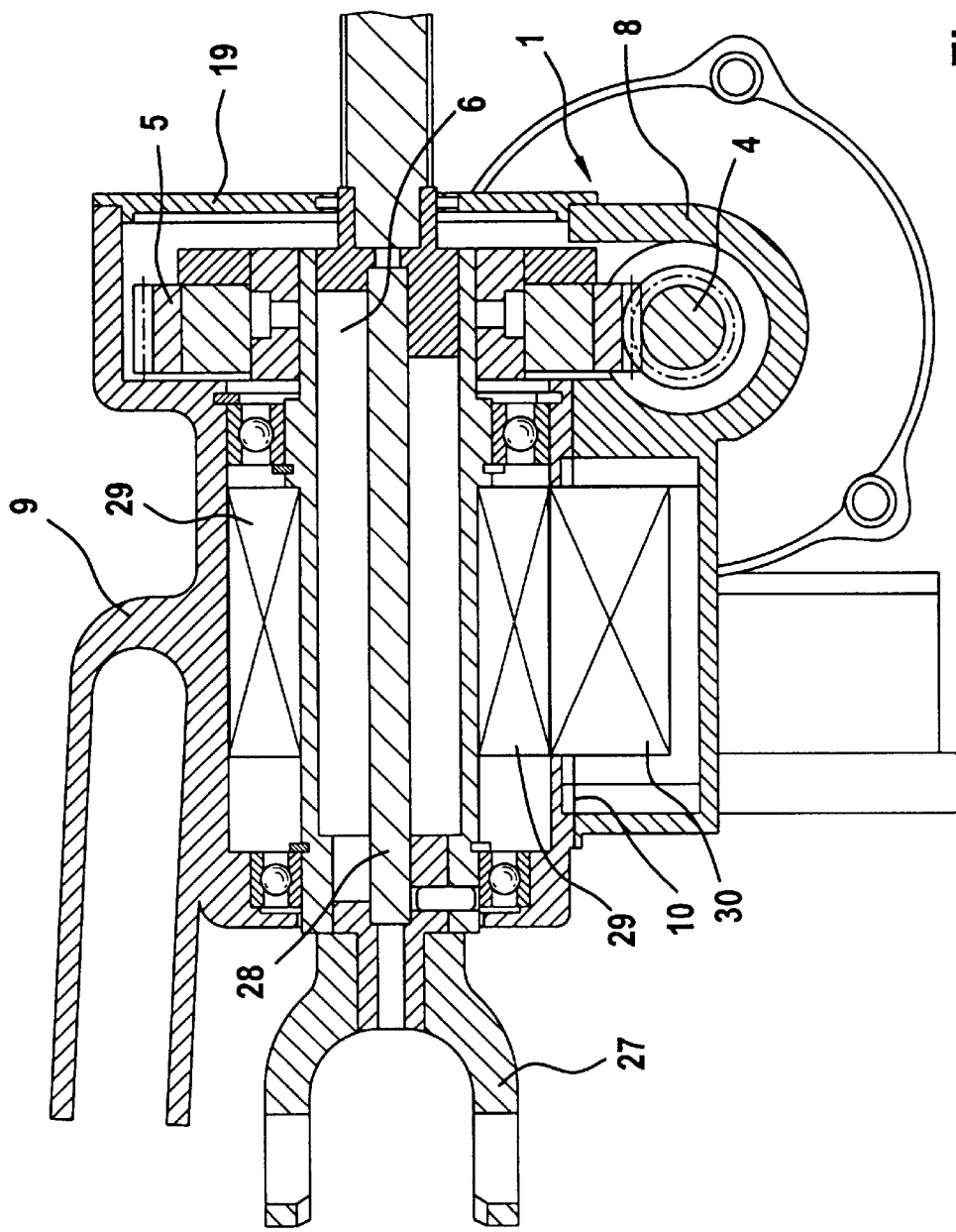
FIG. 7 shows a cross section of the worm-gear housing through the output shaft.

The installation situation of the worm-gear 1 for use as an electric steering aid in motor vehicles becomes clear from FIG. 7. In this case, the output shaft 6 of the worm-ear 1 forms part of a steering column 27. A sensor bar 28 is arranged inside the steering column 27 in an aperture (bore); that is to say that the steering column 27, in one section, is arranged concentrically around the sensor bar 28, which detects torsion of the steering column 27. This torsion is likewise detected by a transformer coil 29 arranged concentrically around the steering column 27, so that a voltage is induced in this transformer coil 29. Provided for the non-contact tapping of this voltage is a further transformer coil 30, which is arranged as a half shell around the transformer coil 29, its output signal being fed to control electronics (not shown in FIG. 7).

In order to protect the worm drive from brief overloads due to shocks acting on the steering column 27, the worm-wheel 5 may be coupled to the output shaft 6 via a slip clutch, as described in DE 198 11 784. Mounting of the motor shaft 3 in such a way that it is axially displaceable against a restoring force is also suitable for absorbing brief shock loads.

Figure 8:
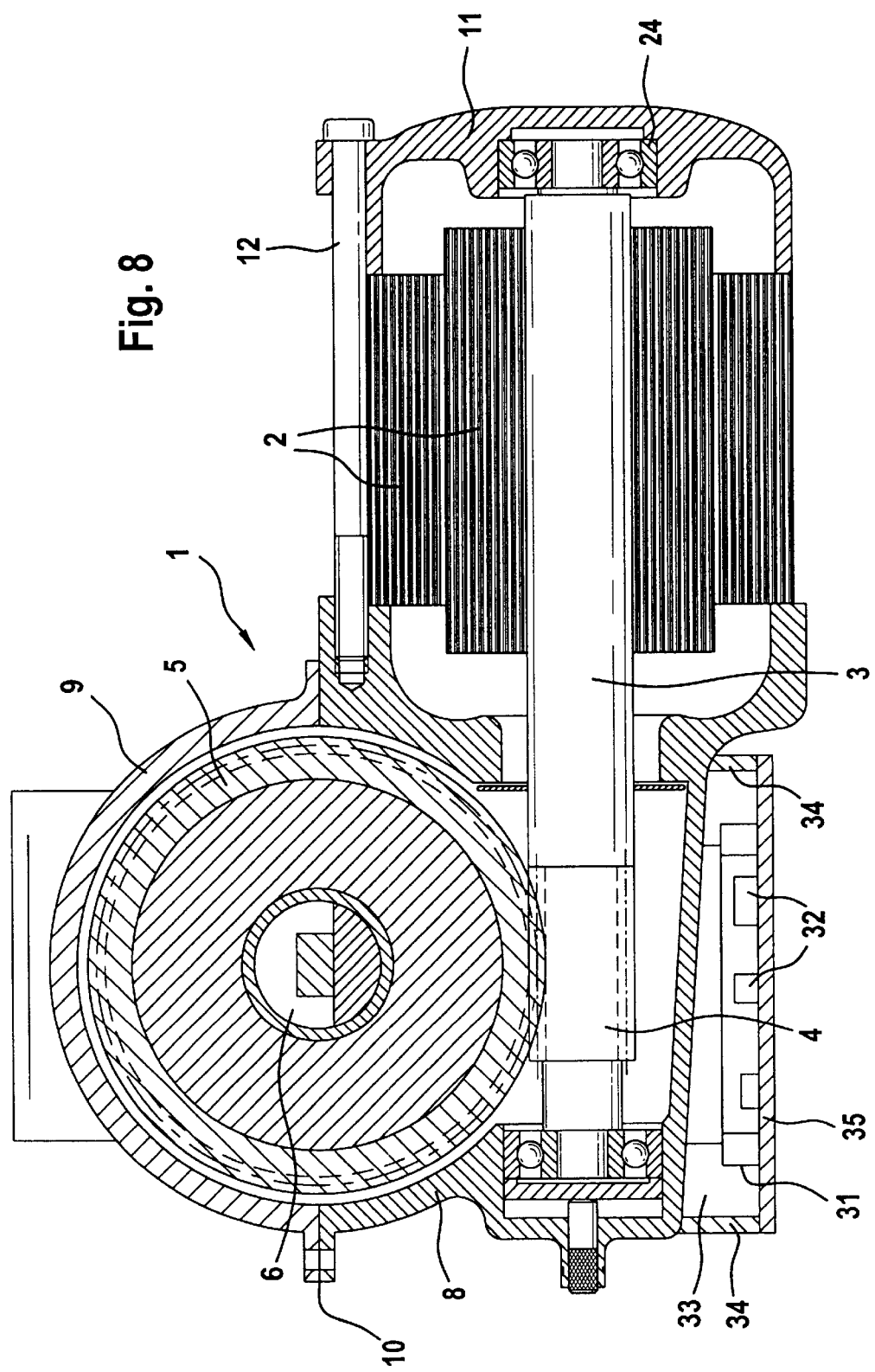
FIG. 8 shows a cross section of a worm-gear housing with a further variant of a dividing plane.

FIG. 8 shows a cross section of a worm-gear housing with a further variant of an arrangement of the dividing plane. It can be seen here that the dividing plane 10 intersects the output shaft 6 in the axial direction, projections allocated to one another being provided on both the first housing part 8 and the second housing part 9, by means of which projections both housing parts are connected to one another on the one side. On its other side, the second housing part 9 likewise has this projection, with which it is fastened to the region of solid design of the first housing part 8 (roughly at the one end side of the electric motor 2).

It is also shown in FIG. 8 that the gear housing—here the first housing part 8—accommodates control electronics 31 having a plurality of components 32. At least the output signal of the transformer coil 30 is fed as input signal to the control electronics 31, the electric motor 2 being controlled as a function of at least this output signal and, if need be, further signals. For this purpose, the control electronics 31 are electrically interconnected with the electric motor 2, the spatial proximity of control electronics 31 and electric motor 2 being of advantage with regard to a short connection (in particular cabling).

The control electronics 31 are accommodated in a moisture- and dust-proof manner in a chamber 33, which is formed by a plurality of side walls 34 and a cover 35. The side walls 34 and the first housing part 8 may form a construction unit (one-piece), whereas it is also conceivable to attach the side walls 34 later, that is after manufacture of the first housing part 8. With an encircling seal (not shown) placed in between, the cover 35 is fastened to the side walls 34. The chamber 33 is thus accessible for the installation and also for the subsequent testing or exchange of the control electronics 31. Alternatively, it is also conceivable for the side walls 34 and the cover 35 to form a construction unit, which is fastened to the first housing part 8 with an encircling seal (not shown) placed in between.

Figure 9:
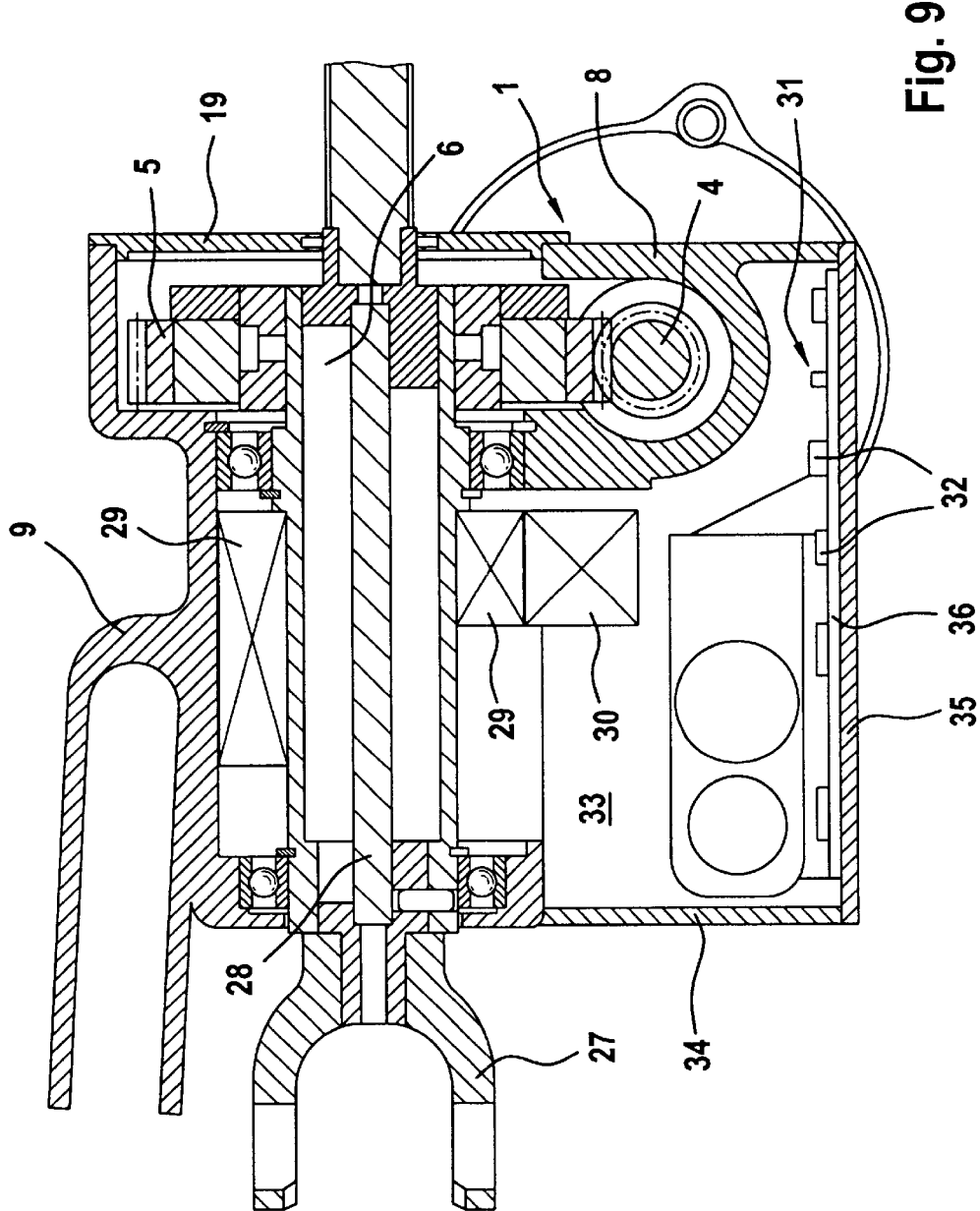
FIG. 9 shows a cross section of the worm-gear housing through the output shaft according to FIG. 8.

FIG. 9 shows a cross section of the worm-gear housing through the output shaft according to FIG. 8, in which case it is also to be noted that the side walls 34 with the cover 35 may be fastened to the already closed worm-gear housing, but may also serve for the contamination-protected closing of an at least partly open worm-ear housing. The side walls 34 with the cover 35 may therefore be independent components or may be an integral part of the worm-gear housing. A configuration of the transformer coils 29 and 30 which is modified compared with FIG. 7 is likewise shown, in which case the short connection between the transformer coil 30 and the control electronics 31 can also be seen. Designated for the control electronics 31 by reference numeral 36 is a printed circuit board, which accommodates the components 32 and the connections, for example via plug connectors (not shown), to the transformer coil 30 and the electric motor 2.

Figure 10:
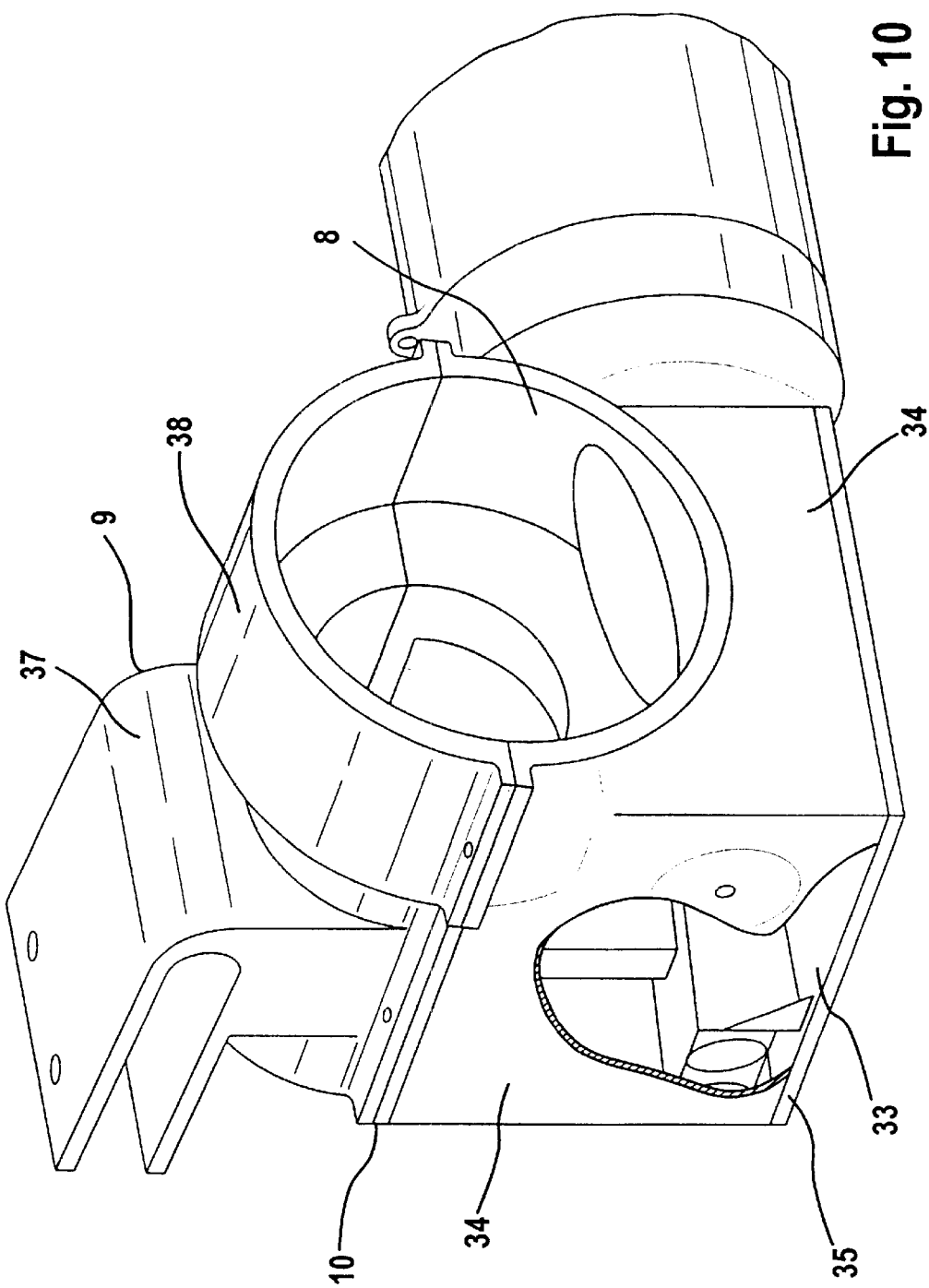
FIG. 10 shows a three-dimensional view according to FIGS. 8 and 9.

FIG. 10 shows a three-dimensional view according to FIGS. 8 and 9, in which case it can be seen that the second housing part 9 consists of two parts, which are designated by reference numeral 37 and 38 in FIG. 10. The housing part 37 is a fixed integral part of the second housing part 9, whereas the housing part 38 is removable. By removal of the housing part 38, the worm-gear 1 is accessible, for example, for maintenance purposes (lubrication). The printed circuit board 36 of the control electronics 31 may be fastened in a suitable manner to at least one housing part, to a side wall or the cover.

What is claimed is:

1. A worm-gear comprising: an electric motor having a motor shaft connected to a worm, an output shaft connected to a worm-wheel which meshes with the worm, and a housing in which the motor shaft and the output shaft are each rotatably mounted in respective pairs of bearings, wherein the motor shaft, the worm and both bearings for the motor shaft are mounted in a first housing part of the housing forming a first separate unit, wherein the output shaft, the worm-wheel and both bearings for the output shaft are mounted in a second housing part forming a second separate unit, and wherein the first unit can be separated from and re-connected to the second unit in a radial direction to the motor shaft.

2. The worm-gear as claimed in claim 1, wherein a dividing plane of the two housing parts lies between the longitudinal axes of the motor shaft and the output shaft.

3. The worm-gear as claimed in claim 2, wherein the motor shaft has two ends and one of the motor shaft bearings is located proximate a first end of the motor shaft and the second motor shaft bearing is located proximate the second end of the motor shaft.

4. The worm-gear as claimed in claim 2, wherein the motor shaft has two ends and one of the bearings for the motor shaft is provided between the worm and the electric motor, and the second bearing is provided proximate an end of the motor shaft.

5. The worm-gear as claimed in claim 2, wherein the motor shaft has two ends and the housing further comprises a motor-housing cover removably connected to the first housing part, and wherein one of the bearings for the motor shaft is arranged in the motor-housing cover proximate one end of the motor shaft.

6. The worm-gear as claimed in claim 2, further comprising a torque sensor adjacent the output shaft and a transformer coil and control electronics arranged in the first housing part, wherein the torque sensor has a measuring signal which can be detected by the transformer coil which is coupled to the control electronics for controlling the electric motor.

7. The worm-gear as claimed in claim 1, wherein a dividing plane of the two housing parts intersects the output shaft in the axial direction.

8. The worm-gear as claimed in claim 7, wherein the motor shaft has two ends and the housing further comprises a motor-housing cover removably connected to the first housing part, and wherein one of the bearings for the motor shaft is arranged in the motor-housing cover proximate one end of the motor shaft.

9. The worm-gear as claimed in claim 7 further comprising a torque sensor adjacent the output shaft and a transformer coil and control electronics arranged in the first housing part, wherein the torque sensor has a measuring signal which can be detected by the transformer coil which is coupled to the control electronics for controlling the electric motor.

10. The worm-gear as claimed in claim 1, wherein the motor shaft has two ends and the housing further comprises a motor-housing cover removably connected to the first housing part, and wherein one of the bearings for the motor shaft is arranged in the motor-housing cover proximate one end of the motor shaft.

11. The worm-gear as claimed in claim 1, wherein the two motor shaft bearings have inner rings which are arranged in an interference fit on the motor shaft.

12. The worm-gear as claimed in claim 1, further comprising an overload clutch wherein the worm-wheel is coupled to the output shaft via the overload clutch.

13. The worm-gear as claimed in claim 1, wherein the motor shaft is mounted so as to be axially displaceable against a restoring force.

14. An electric steering aid, which comprises a worm-gear as claimed in claim 1.

* * * * *